United States Patent Office 2,834,761
Patented May 13, 1958

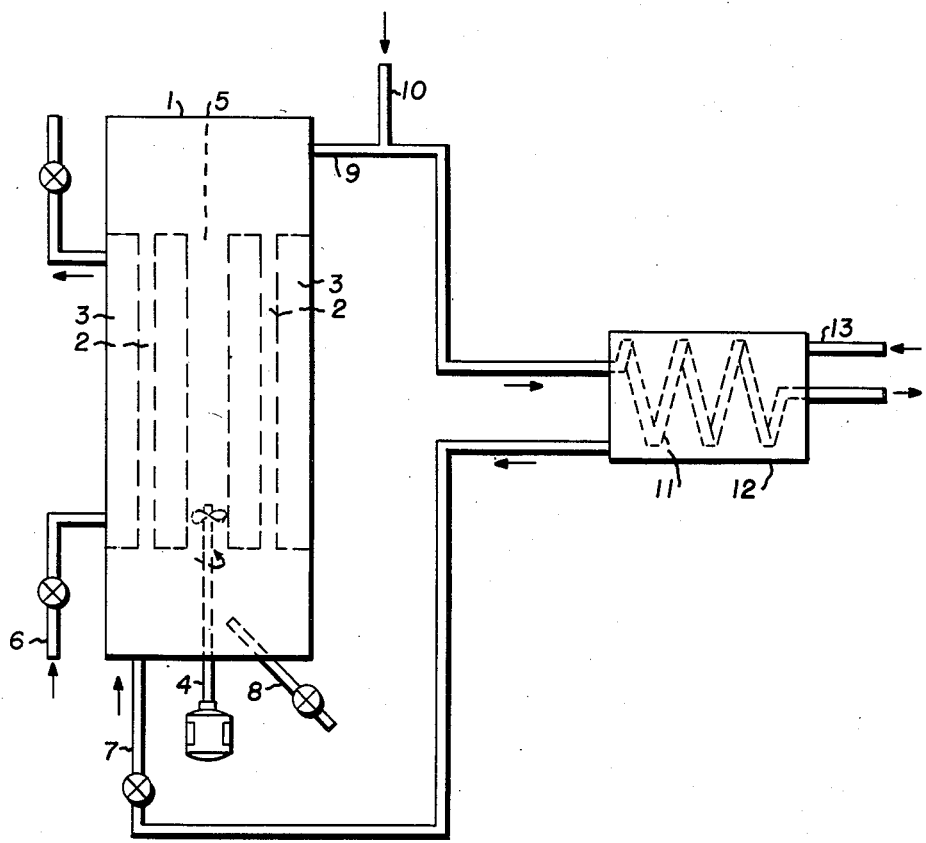
Harold J. Rose
John L. Ernst    Inventors
By  W. H. Smyers   Attorney

2,834,761

METHOD FOR HANDLING OF EFFLUENT STREAMS FROM POLYMERIZATION PROCESS

Harold J. Rose and John L. Ernst, Baton Rouge, La., assignors to Esso Research and Engineering Company, a corporation of Delaware Application June 24, 1953, Serial No. 363,727

8 Claims. (Cl. 260—85.3)

This invention relates to an improved process for making high molecular weight polymers in the presence of a suitable solvent in which the resulting polymers are at least substantially soluble. More particularly it relates to an improved method for the handling of effluent streams from such processes.

It is known, as disclosed in U. S. Patent 2,356,128, that high molecular weight synthetic rubber can be made by copolymerizing isobutylene and a diolefin such as isoprene or butadiene at temperatures below 0° C. with a dissolved Friedel-Crafts catalyst such as aluminum chloride dissolved in methyl chloride. This process has been carried out commercially, for instance, by polymerizing 97–98% of isobutylene with 2 or 3% of isoprene at −103° C., in the presence of 2 or 3 volumes of methyl chloride per volume of reactants. The resultant copolymer has a high molecular weight, generally about 20,000 to 150,000 Staudinger, usually about 30,000 to 100,000 with a relatively low chemical unsaturation, as indicated by an iodine number in the range of about 1 to 50, usually about 1 to 10. Although the reactants, isobutylene and isoprene, are soluble in the methyl chloride diluent, the resultant polymer is insoluble in the methyl chloride, and generally takes the form of fine particles suspended as a slurry in the liquid methyl chloride, together with any unreacted reactants and the residual catalyst solution. This entire reaction mixture is then generally poured into hot water, preferably containing a small amount of zinc stearate, whereupon the methyl chloride is flashed off along with any unreacted isobutylene and isoprene. The resultant slurry of insoluble rubbery polymer particles suspended in water is then separated from most of the water by passing through a vibrating screen or collecting on a rotary filter, and finally passing through a drier to remove residual water.

Several features about the above-described process are relatively expensive and time-consuming. For instance, when methyl chloride diluent is flashed off as a vapor, it must be recondensed and cooled down to the reaction temperature; e. g. −103° C. It would be desirable, by heat exchangers, to use the cold reaction liquid to remove some heat from incoming reactants before flashing the reaction liquid into hot water, but this cannot be done when methyl chloride is used as diluent because the insoluble polymer coalesces on the heat exchanger surfaces.

Attempts have been made heretofore to carry out this polymerization in the presence of a liquefied hydrocarbon, such as butane, in which the resultant polymer would be soluble. The advantage of such a solution process is the lower refrigeration cost made possible by heat exchanging the reactor effluent with the incoming reactor feed. However, it is found that the butanes, and even pentanes are not sufficiently good solvents for the high molecular weight isobutylene-diolefin synthetic rubber. In fact, a phase separation between the polymer and the hydrocarbon occurs as the effluent stream from the reactor is warmed up by heat exchange with the incoming feed.

According to the present invention it has been discovered that liquefied normally gaseous hydrocarbons can be used as reaction diluents and the above disadvantages avoided by adding to the effluent from the reactor and before heat exchange with incoming feed a higher boiling material which is a solvent for the polymer and which boils between 15° and 175° C. Suitable materials include aliphatic and cyclic hexanes and heptanes, e. g., methylcyclo-hexane. Since the higher boiling material is added after the polymerization step, it is immaterial that it may be a catalyst or molecular weight poison if it were added during the reaction. Other materials which are solvents for the polymer may also be used; for example, methylene chloride is effective at temperatures above −40° C. Materials boiling above 175° C. are not practical for this purpose because of subsequent processing difficulties due to the difficulty of removing the solvent from the polymer. The amount of higher boiling material to be added to the liquefied hydrocarbon may vary from 5 to 20%, but is preferably used in an amount of about 10%.

The liquefied reaction diluent, of course, may include any normally gaseous liquefied saturated hydrocarbon, such as ethane, propane, normal and isobutane, normal and isopentane, and the like. As Friedel-Crafts catalyst, it is preferred to use one which is sufficiently soluble in the liquefied hydrocarbon that it can be used in the desired concentration to effect polymerization. Aluminum chloride, boron-fluoride, and some of the other commonly used Friedel-Crafts catalyst are not very soluble in hydrocarbons, and accordingly it is preferred to use aluminum bromide or other catalysts which do have good hydrocarbon solubility. A number of complexes of a Friedel-Crafts catalyst with an organic compound may be used such as complexes with dichloroethyl ether, anisole, etc.

The polymerization may be carried out at any temperature below 0° C. but it is preferable to use temperatures below −40° C., and better still, temperatures from −50° C., to −103° C. This lower temperature range is particularly desirable when it is intended to make a polymer of highest molecular weight, such as an isobutylene-isoprene synthetic rubber having a molecular weight of 20,000 to 200,000 preferably 30,000 to 150,000 Staudinger.

To make synthetic rubber by this process, it is generally desirable to use an isobutylene feed containing about 1 to 30% of a $C_4$–$C_6$ diolefin. The amount of the latter depends somewhat upon the particular diolefin used. For instance, with butadiene, the preferred concentration is about 1% to 50%. In either case, the resulting copolymer contains about 1 to 10% of combined diolefin, the balance being isobutylene.

The amount of aluminum bromide catalyst to be used should generally be about 0.01 to 1.0% by weight, based on the reactants, and this may be added as a solution of any desired concentration ranging from 0.01 to 2.0% in the liquefied hydrocarbon.

The amount of reaction diluent, i. e., liquefied hydrocarbon containing a small amount of higher boiling material, may vary according to a number of factors such as temperature of polymerization, diolefin content, molecular weight and Mooney viscosity desired for the polymer product, etc., but normally should be about 0.1 to 4.0 parts by weight per part of mixed reactants, preferably about 0.25 to 1.5 parts by weight per part of reactants.

During the course of the polymerization the polymer molecules grow very rapidly to a high molecular weight, and being still dissolved in the liquefied hydrocarbon solvent, a great increase in viscosity occurs, and therefore, the amount of polymer formed, i. e., the percent conversion, must not be permitted to become excessive. Usually the conversion should be maintained within the range from about 3 to 20%, preferably 5 to 10%, based on the total amount of reactants used, in order to keep the reaction liquid at a readily flowable viscosity.

The accompanying drawing illustrates one method of operating the process according to this invention.

A reactor 1 is provided with a plurality of tubes 2 and space 3. An impeller type agitator 4 is provided in central tube 5. Liquid refrigerant, suitably ethylene, is introduced into space 3 through line 6. A reactant mixture of iso-olefin, diolefin and n-butane diluent, precooled as described below enters the reactor through line 7. A solution of aluminum bromide in liquefied n-butane is added through line 8. The reactant mixture is thoroughly agitated by impeller type agitator 4 so that a circulation of the reacting mixture is produced up through central tube 5 and down through a plurality of peripheral smaller tubes 2. The reactor is maintained essentially full of liquid, a solution of polymer in excess unreacted hydrocarbons and diluent overflowing from the reactor through line 9 in amount corresponding to the material fed to the reactor through lines 7 and 8. About 10%, based on the n-butane, of methylcyclohexane is added through line 10 to the effluent flowing in line 9. The resulting mixture is passed through coil 11 in heat exchange with fresh feed passing through the heat exchanger jacket 12 and introduced thereto through line 13. Although the temperature of the reactor solution is warmed up by the incoming feed no polymer is precipitated on the walls of the coil 11 but instead remains solvated in the diluent mixture.

The following experimental data are given to show the advantages of using a small amount of a higher boiling material in conjunction with a liquefied hydrocarbon as compared to a liquefied hydrocarbon not containing any additional material.

*Example I*

A batch run was made using 300 grams of mixed butanes, 1700 grams isobutylene, 25.5 grams of isoprene and about 180 cc. of an aluminum bromide catalyst solution containing 0.75 gram of aluminum bromide per 100 cc. butanes. The reactor effluent was clear and contained approximately 12 weight percent polymer indicating that any undissolved polymer was probably in the colloidal range. When allowed to stand at reaction temperature (−73° C.) the polymer did not settle out. The reactor effluent was divided into two portions and one portion was allowed to warm up. As the temperature reached (−45.5° C.) the polymer begain to separate; the separation was rapid at temperatures above −45° C. To the second portion of the reactor effluent was added about 10% by volume of methyl cyclohexane and the system was allowed to warm up to +26° C. There was no indication of phase separation at any stage during this warming up period or at any time thereafter.

The nature of the present invention having thus been fully set forth, what is claimed as new and useful and desired to be secured by Letters Patent is:

1. In the process of polymerizing isobutylene with a minor amount of $C_4$ to $C_6$ diolefin with a Friedel-Crafts catalyst at temperatures below −40° C., in the presence of a liquefied normally gaseous saturated hydrocarbon of 2 to 5 carbon atoms as reaction diluent, the improvement which comprises completing the polymerization reaction to the desired percent conversion, withdrawing cold reaction liquid, containing polymer at least substantially dissolved in the reaction diluent together with unreacted monomers and residual catalyst, from the reaction zone, adding thereto 5 to 20% of a higher boiling substantially inert material boiling between 15 and 175° C., which is a solvent for the polymer, and passing the resulting mixture in heat exchange with fresh feed whereby precipitation of polymer from said cold reaction liquid during said heat exchange is substantially prevented.

2. Process according to claim 1 in which the diolefin is isoprene.

3. Process according to claim 1 in which the catalyst is aluminum bromide.

4. Process according to claim 1 in which the reaction diluent is a liquefied normally gaseous hydrocarbon of 2 to 4 carbon atoms.

5. Process according to claim 1 in which the reaction diluent is butane.

6. Process according to claim 1 in which the material boiling between 15 and 175° C., is methylcyclohexane.

7. Process according to claim 1 in which the material boiling between 15 and 175° C. is a material selected from the group consisting of cyclic hexanes and heptanes.

8. In the process of making a synthetic rubber containing 99 to 90% of combined isobutylene and 1 to 10% of combined diolefin selected from the group consisting of butadiene and isoprene, by copolymerizing a major proportion of isobutylene and a minor proportion of said diolefin at a temperature at least as low as −73° C. in the presence of a Friedel-Crafts catalyst and in the presence of liquefied butane as reaction diluent, the improvement comprising completing the polymerization reaction to the desired percent conversion, withdrawing cold reaction liquid containing polymer at least substantially dissolved in the reaction diluent together with unreacted monomers and residual catalyst from the polymerization reaction zone, adding thereto about 5 to 20% of methylcyclohexane and then passing the resulting mixture in heat exchange with fresh feed mixture of isobutylene and said diolefin, said methylcyclohexane serving to substantially prevent precipitation of polymer from said cold reaction liquid during said heat exchange.

References Cited in the file of this patent

UNITED STATES PATENTS

| | | |
|---|---|---|
| 2,607,763 | Hipkin | Aug. 19, 1952 |
| 2,727,022 | Linsk | Dec. 13, 1956 |
| 2,779,753 | Garabrant et al. | Jan. 29, 1957 |